(12) United States Patent
San Adrian et al.

(10) Patent No.: US 9,696,992 B2
(45) Date of Patent: Jul. 4, 2017

(54) APPARATUS AND METHOD FOR PERFORMING A CHECK TO OPTIMIZE INSTRUCTION FLOW

(71) Applicant: INTEL CORPORATION, Santa Clara, CA (US)

(72) Inventors: Jesus Corbal San Adrian, Hillsboro, OR (US); Robert N. Hanek, Hollis, NH (US); Warren E. Ferguson, Beaverton, OR (US); Taraneh Bahrami, San Jose, CA (US); Avi A. Tevet, Portland, OR (US); Dennis R. Bradford, Portland, OR (US); Michael Ferry, Hillsboro, OR (US); Jingwei Zhang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 241 days.

(21) Appl. No.: 14/581,815

(22) Filed: Dec. 23, 2014

(65) Prior Publication Data

US 2016/0179515 A1 Jun. 23, 2016

(51) Int. Cl.
*G06F 7/38* (2006.01)
*G06F 9/30* (2006.01)
*G06F 9/38* (2006.01)
*G06F 9/455* (2006.01)

(52) U.S. Cl.
CPC ........ *G06F 9/3001* (2013.01); *G06F 9/30014* (2013.01); *G06F 9/30076* (2013.01);
(Continued)

(58) Field of Classification Search
None
See application file for complete search history.

(56) References Cited

U.S. PATENT DOCUMENTS

| 5,134,693 A | 7/1992 | Saini |
| 6,099,158 A | 8/2000 | Gorshtein et al. |

(Continued)

FOREIGN PATENT DOCUMENTS

| CA | EP 2275930 A1 * | 1/2011 | ......... G06F 9/30174 |
| EP | 2275930 A1 | 1/2011 | |

(Continued)

OTHER PUBLICATIONS

Transmittal of the International Search Report and the Written Opinion of the International Searching Authority from Patent Cooperation Treaty Application No. PCT/US2015/062056, mailed Mar. 31, 2016, 12 pages.

(Continued)

*Primary Examiner* — Hyun Nam
(74) *Attorney, Agent, or Firm* — Nicholson De Vos Webster & Elliott LLP

(57) ABSTRACT

An apparatus and method for performing a check on inputs to a mathematical instruction and selecting a default sequence efficiently managing the architectural state of a processor. For example, one embodiment of a processor comprises: an arithmetic logic unit (ALU) to perform a plurality of mathematical operations using one or more source operands; instruction check logic to evaluate the source operands for a current mathematical instruction and to determine, based on the evaluation, whether to execute a default sequence of operations including executing the current mathematical instruction by the ALU or to jump to an alternate sequence of operations adapted to provide a result for the mathematical instruction having particular types of source operands more efficiently than the default sequence of operations.

25 Claims, 18 Drawing Sheets

(52) U.S. Cl.
CPC ...... *G06F 9/30145* (2013.01); *G06F 9/30181* (2013.01); *G06F 9/3861* (2013.01); *G06F 9/4552* (2013.01); *G06F 9/45525* (2013.01)

(56) References Cited

U.S. PATENT DOCUMENTS

| | | |
|---|---|---|
| 6,477,639 B1 | 11/2002 | Krishnan et al. |
| 2003/0225998 A1* | 12/2003 | Khan .................... G06F 9/3001 712/210 |
| 2007/0061551 A1* | 3/2007 | Fischer ................ G06F 9/3001 712/202 |
| 2009/0249037 A1 | 10/2009 | Webber |
| 2013/0246755 A1 | 9/2013 | Farrell et al. |
| 2013/0246770 A1 | 9/2013 | Farrell et al. |
| 2014/0164740 A1 | 6/2014 | Gschwind et al. |

FOREIGN PATENT DOCUMENTS

| | | |
|---|---|---|
| TW | 201401045 A | 1/2014 |
| TW | 201403314 A | 1/2014 |
| WO | 2014128153 A1 | 8/2014 |

OTHER PUBLICATIONS

Allowance Decision and Taiwan Search Report from foreign counterpart Taiwan Patent Application No. 104138536, mailed Sep. 22, 2016, 4 pages.

Notice of Allowance with English translation from foreign counterpart Taiwan Patent Application No. 104138536, mailed Sep. 22, 2016, 3 pages.

\* cited by examiner

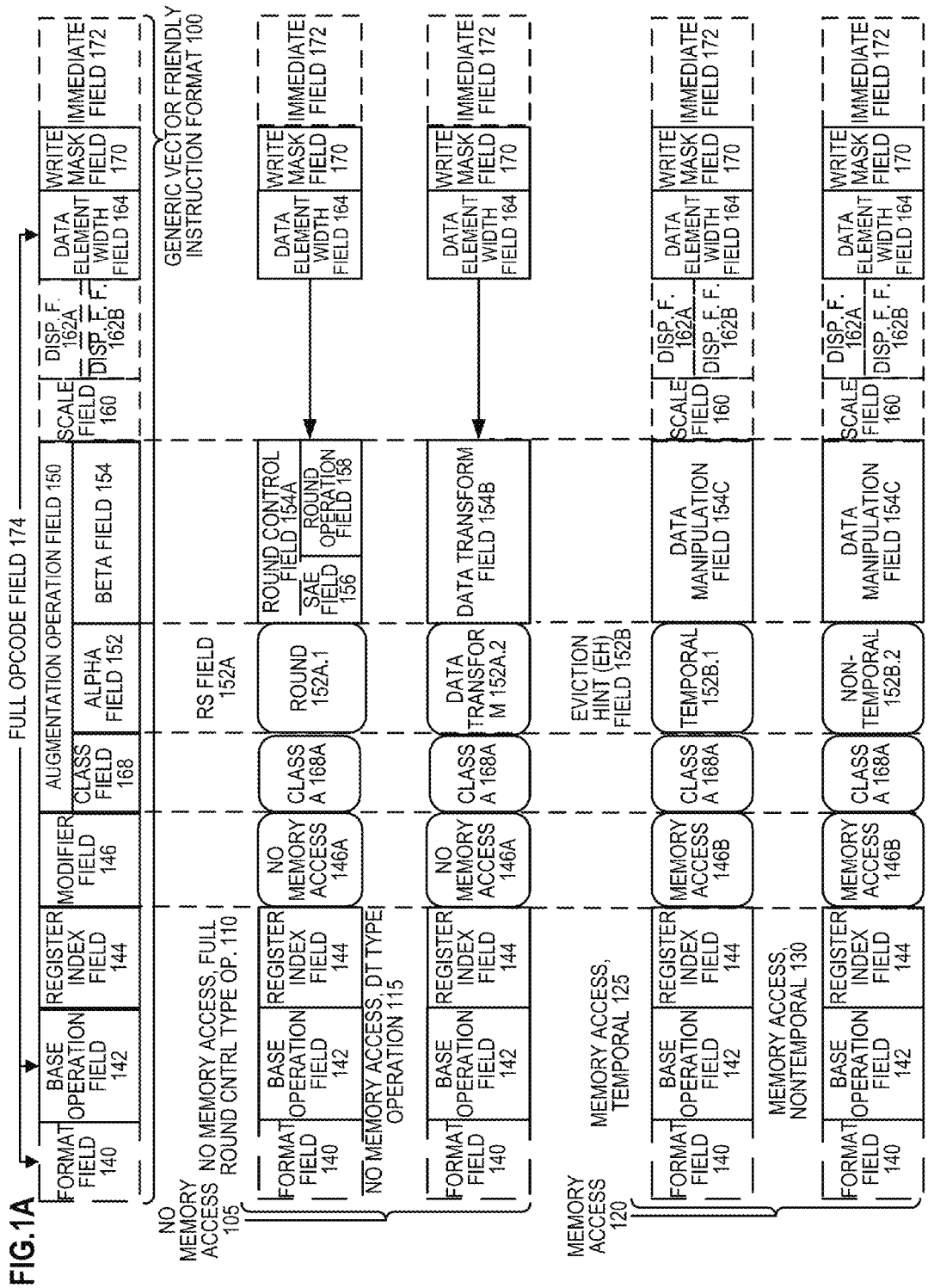

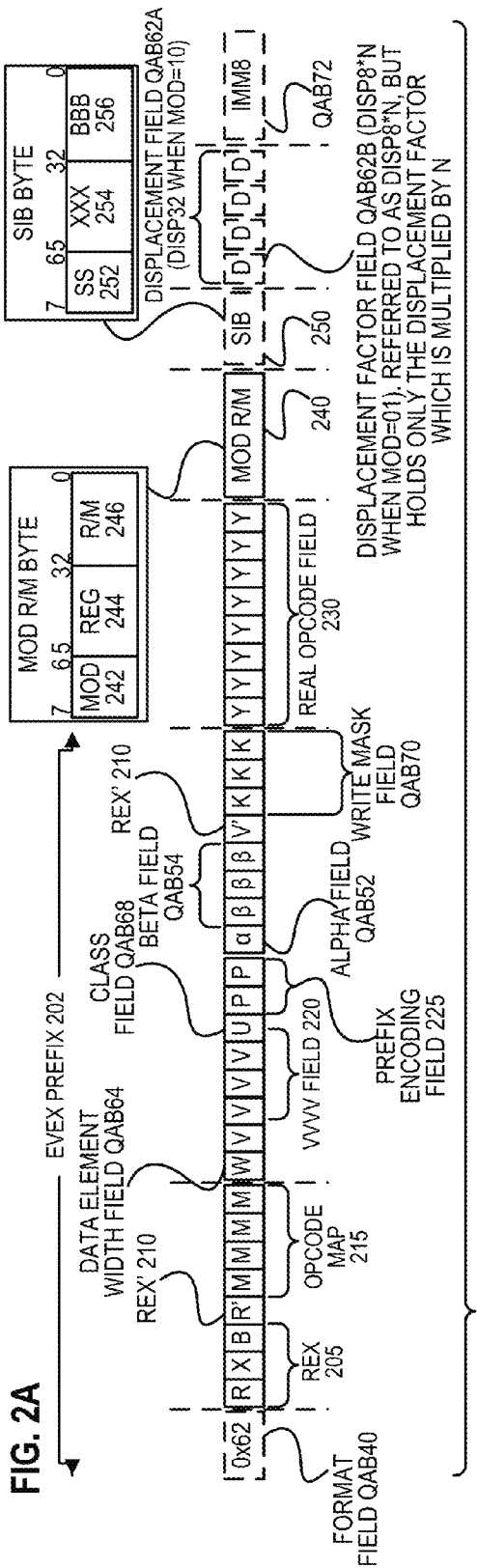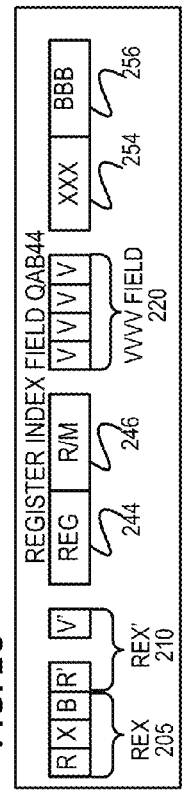

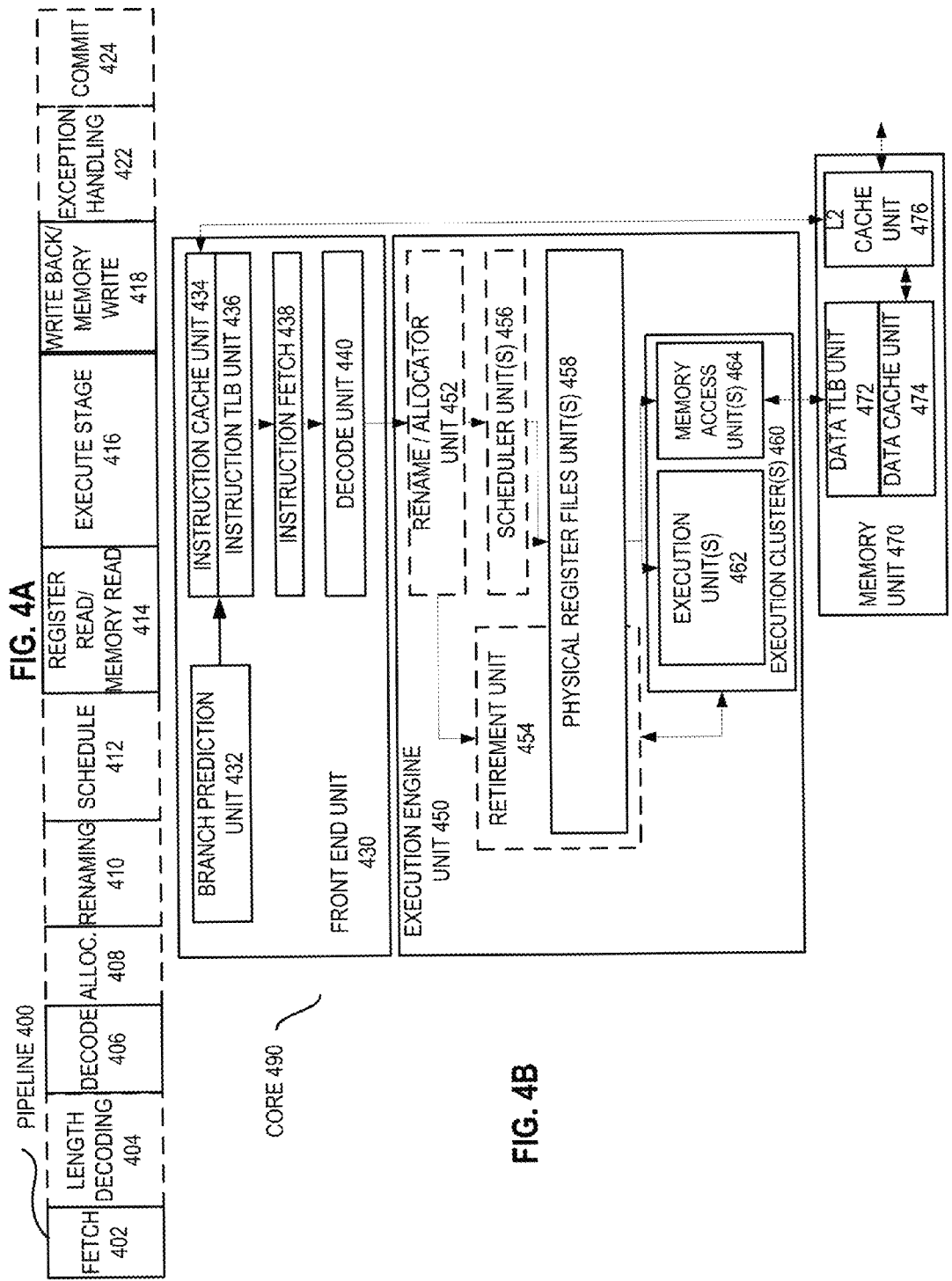

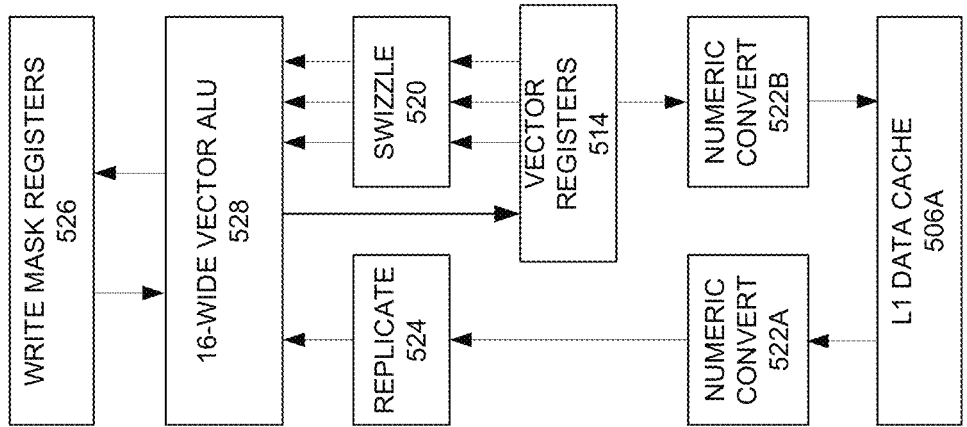
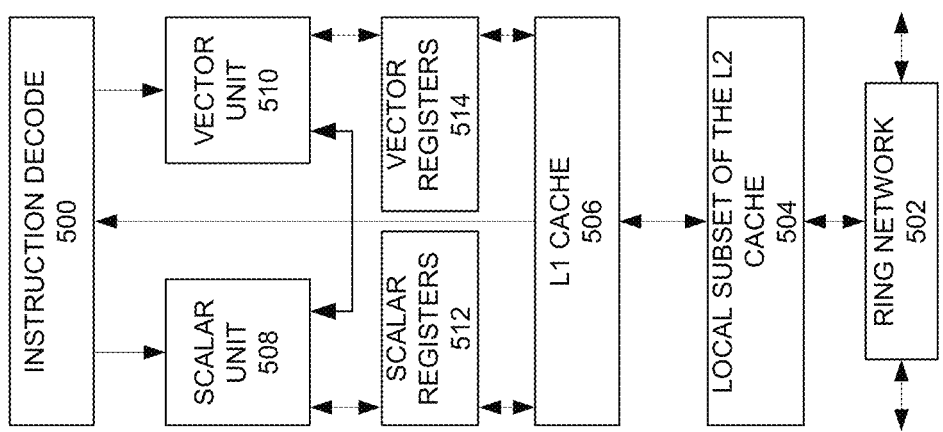

| x\y | ±0 | ±denorm | ±norm | ±Inf | qNaN | sNaN |
|---|---|---|---|---|---|---|
| ±0 | (0, QNaN_ind, #IE) | (0, ±0, #IE) | (0, ±0, None) | (0, ±0, None) | (0, y, None) | (0, QtoN(y), #IE) |
| ±denorm | (0, ±Inf, #ZE) | (0, ±1, #DE) | (0, ±1, #DE) | (0, ±0, None) | (0, y, None) | (0, QtoN(y), #IE) |
| ±norm | (0, ±Inf, #ZE) | (0, ±1, #DE) | See Below | (0, ±0, None) | (0, y, None) | (0, QtoN(y), #IE) |
| ±Inf | (0, ±Inf, None) | (0, ±Inf, #DE) | (0, ±Inf, None) | (0, QNaN_ind, #IE) | (0, y, None) | (0, QtoN(y), #IE) |
| qNaN | (0, x, None) | (0, x, None) | (0, x, None) | (0, x, None) | (0, x, None) | (0, x, #IE) |
| sNaN | (0, QtoN(x), #IE) | (0, QtoN(x), #IE) | (0, QtoN(x), #IE) | (0, QtoN(x), #IE) | (0, QtoN(x), #IE) | (0, QtoN(x), #IE) |

*Fig. 14*

| Input (x) | kdst, vdst, flags | type |
|---|---|---|
| -norm (including -Infinity) | (0, NaN, #IE) | Special number |
| -denorm | (0, NaN, #IE) | Special number |
| -0 | (0, x, None) | Special number |
| +0 | (0, x, None) | Special number |
| +denorm | (0, +1.0, #DE) | Slow flow |
| +Infinity | (0, x, None) | Special number |
| qNaN | (0, x, None) | Special number |
| sNaN | (0, qNaN(x), #IE) | Special number |
| BiasExponent(x) ≤ 2*precision [a] | (0, +1.0, None) | Slow flow |
| BiasExponent(x) = 2*bias [b] | (0, +1.0, None) | Slow flow |
| Other | (1, +0.0, None) | Fast flow |

*Fig. 15*

APPARATUS AND METHOD FOR PERFORMING A CHECK TO OPTIMIZE INSTRUCTION FLOW

BACKGROUND

Field of the Invention

This invention relates generally to the field of computer processors. More particularly, the invention relates to a method and apparatus for performing a check to optimize instruction flow.

Description of the Related Art

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

An instruction set includes one or more instruction formats. A given instruction format defines various fields (number of bits, location of bits) to specify, among other things, the operation to be performed and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. A given instruction is expressed using a given instruction format (and, if defined, in a given one of the instruction templates of that instruction format) and specifies the operation and the operands. An instruction stream is a specific sequence of instructions, where each instruction in the sequence is an occurrence of an instruction in an instruction format (and, if defined, a given one of the instruction templates of that instruction format).

BRIEF DESCRIPTION OF THE DRAWINGS

A better understanding of the present invention can be obtained from the following detailed description in conjunction with the following drawings, in which:

FIGS. 1A and 1B are block diagrams illustrating a generic vector friendly instruction format and instruction templates thereof according to embodiments of the invention;

FIG. 2A-D is a block diagram illustrating an exemplary specific vector friendly instruction format according to embodiments of the invention;

FIG. 4A is a block diagram illustrating both an exemplary in-order fetch, decode, retire pipeline and an exemplary register renaming, out-of-order issue/execution pipeline according to embodiments of the invention;

FIG. 4B is a block diagram illustrating both an exemplary embodiment of an in-order fetch, decode, retire core and an exemplary register renaming, out-of-order issue/execution architecture core to be included in a processor according to embodiments of the invention;

FIG. 5A is a block diagram of a single processor core, along with its connection to an on-die interconnect network;

FIG. 5B illustrates an expanded view of part of the processor core in FIG. 5A according to embodiments of the invention;

FIG. 14 illustrates outputs generated for a division check instruction for different types of input values;

FIG. 15 illustrates outputs generated for a square root check instruction for different types of input values.

DETAILED DESCRIPTION

Figure 1B:
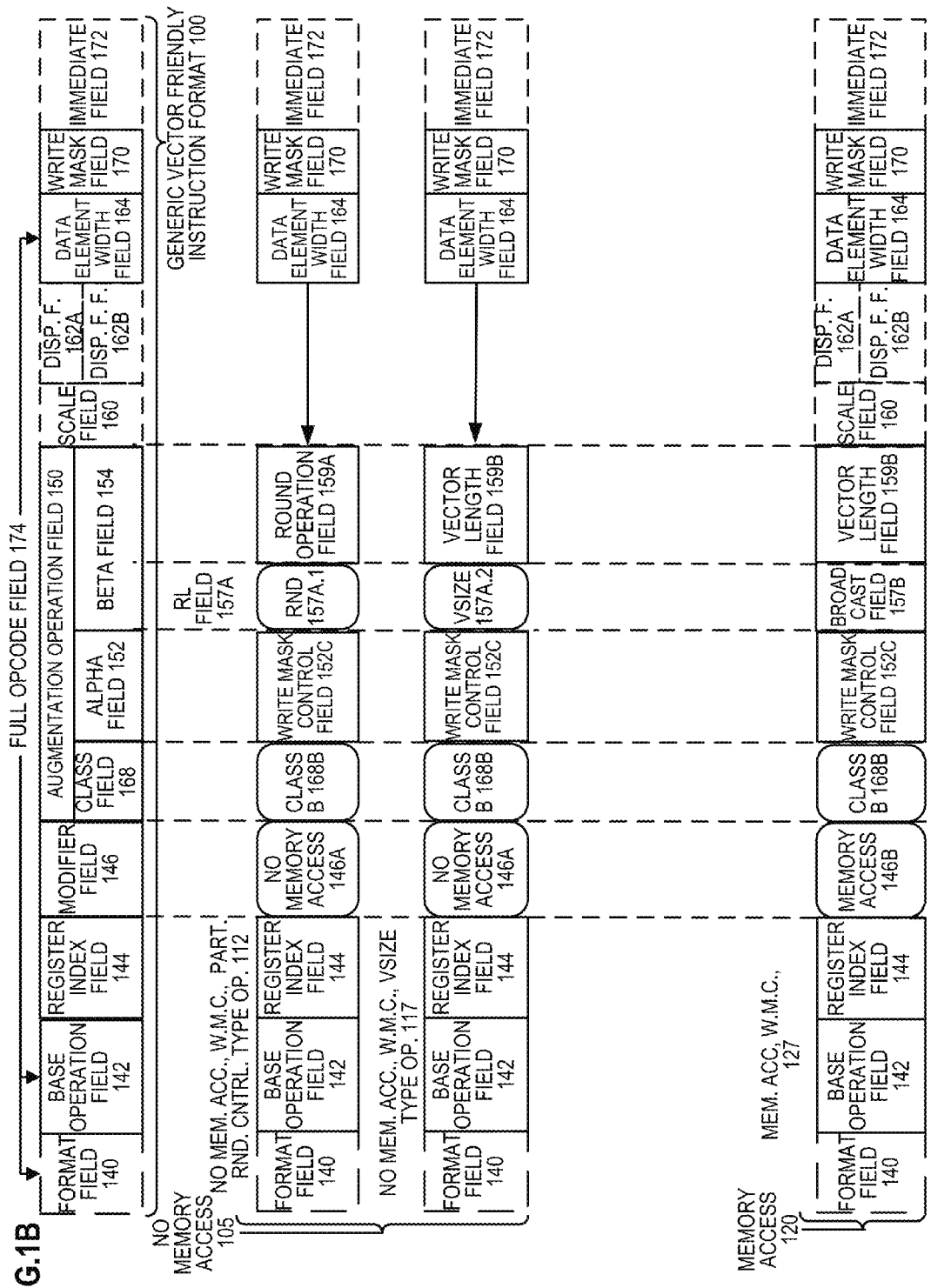

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

A. Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

FIGS. 1A-1B are block diagrams illustrating a generic vector friendly instruction format and instruction templates thereof according to embodiments of the invention. FIG. 1A is a block diagram illustrating a generic vector friendly instruction format and class A instruction templates thereof according to embodiments of the invention; while FIG. 1B is a block diagram illustrating the generic vector friendly instruction format and class B instruction templates thereof according to embodiments of the invention. Specifically, a generic vector friendly instruction format 100 for which are defined class A and class B instruction templates, both of which include no memory access 105 instruction templates and memory access 120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 1A include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, non-temporal 130 instruction template. The class B instruction templates in FIG. 1B include: 1) within the no memory access 105 instruction templates there is shown a no memory access, write mask control, partial round control type operation 112 instruction template and a no memory access, write mask control, vsize type operation 117 instruction template; and 2) within the memory access 120 instruction templates there is shown a memory access, write mask control 127 instruction template.

The generic vector friendly instruction format 100 includes the following fields listed below in the order illustrated in FIGS. 1A-1B.

Format field 140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 150—its content distinguishes which one of a variety of different operations to be performed in addition to the base operation. This field is context specific. In one embodiment of the invention, this field is divided into a class field 168, an alpha field 152, and a beta field 154. The augmentation operation field 150 allows common groups of operations to be performed in a single instruction rather than 2, 3, or 4 instructions.

Scale field 160—its content allows for the scaling of the index field's content for memory address generation (e.g., for address generation that uses $2^{scale}$*index+base).

Displacement Field 162A—its content is used as part of memory address generation (e.g., for address generation that uses $2^{scale}$*index+base+displacement).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 174 (described later herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logical, etc. While embodiments of the invention are described in which the write mask field's 170 content selects one of a number of write mask registers that contains the write mask to be used (and thus the write mask field's 170 content indirectly identifies that masking to be performed), alternative embodiments instead or additional allow the mask write field's 170 content to directly specify the masking to be performed.

Immediate field 172—its content allows for the specification of an immediate. This field is optional in the sense that is it not present in an implementation of the generic vector friendly format that does not support immediate and it is not present in instructions that do not use an immediate.

Class field 168—its content distinguishes between different classes of instructions. With reference to FIGS. 1A-B, the contents of this field select between class A and class B instructions. In FIGS. 1A-B, rounded corner squares are used to indicate a specific value is present in a field (e.g., class A 168A and class B 168B for the class field 168 respectively in FIGS. 1A-B).

Instruction Templates of Class A

In the case of the non-memory access 105 instruction templates of class A, the alpha field 152 is interpreted as an RS field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement scale filed 162B are not present.

No-Memory Access Instruction Templates—Full Round Control Type Operation

In the no memory access full round control type operation 110 instruction template, the beta field 154 is interpreted as a round control field 154A, whose content(s) provide static rounding. While in the described embodiments of the invention the round control field 154A includes a suppress all floating point exceptions (SAE) field 156 and a round operation control field 158, alternative embodiments may support may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., Round-up, Round-down, Round-towards-zero and Round-to-nearest). Thus, the round operation control field 158 allows for the changing of the rounding mode on a per instruction basis. In one embodiment of the invention where a processor includes a control register for specifying rounding modes, the round operation control field's 150 content overrides that register value.

No Memory Access Instruction Templates—Data Transform Type Operation

In the no memory access data transform type operation 115 instruction template, the beta field 154 is interpreted as a data transform field 154B, whose content distinguishes which one of a number of data transforms is to be performed (e.g., no data transform, swizzle, broadcast).

In the case of a memory access 120 instruction template of class A, the alpha field 152 is interpreted as an eviction hint field 152B, whose content distinguishes which one of the eviction hints is to be used (in FIG. 1A, temporal 152B.1 and non-temporal 152B.2 are respectively specified for the memory access, temporal 125 instruction template and the memory access, non-temporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement scale field 162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an RL field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement scale filed 162B are not present.

In the no memory access, write mask control, partial round control type operation 110 instruction template, the rest of the beta field 154 is interpreted as a round operation field 159A and exception event reporting is disabled (a given instruction does not report any kind of floating-point exception flag and does not raise any floating point exception handler).

Round operation control field 159A—just as round operation control field 158, its content distinguishes which one of a group of rounding operations to perform (e.g., Round-up, Round-down, Round-towards-zero and Round-to-nearest). Thus, the round operation control field 159A allows for the changing of the rounding mode on a per instruction basis. In one embodiment of the invention where a processor includes a control register for specifying rounding modes, the round operation control field's 150 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted the vector length field 159B. The memory access 120 instruction templates include the scale field 160, and optionally the displacement field 162A or the displacement scale field 162B.

With regard to the generic vector friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

B. Exemplary Specific Vector Friendly Instruction Format

FIG. 2 is a block diagram illustrating an exemplary specific vector friendly instruction format according to embodiments of the invention. FIG. 2 shows a specific vector friendly instruction format 200 that is specific in the sense that it specifies the location, size, interpretation, and order of the fields, as well as values for some of those fields. The specific vector friendly instruction format 200 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 1 into which the fields from FIG. 2 map are illustrated.

It should be understood that, although embodiments of the invention are described with reference to the specific vector friendly instruction format 200 in the context of the generic vector friendly instruction format 100 for illustrative purposes, the invention is not limited to the specific vector friendly instruction format 200 except where claimed. For example, the generic vector friendly instruction format 100 contemplates a variety of possible sizes for the various fields, while the specific vector friendly instruction format 200 is shown as having fields of specific sizes. By way of specific example, while the data element width field 164 is illustrated as a one bit field in the specific vector friendly instruction format 200, the invention is not so limited (that is, the generic vector friendly instruction format 100 contemplates other sizes of the data element width field 164).

The generic vector friendly instruction format 100 includes the following fields listed below in the order illustrated in FIG. 2A.

EVEX Prefix (Bytes 0-3) 202—is encoded in a four-byte form.

Format Field 140 (EVEX Byte 0, bits [7:0])—the first byte (EVEX Byte 0) is the format field 140 and it contains 0×62 (the unique value used for distinguishing the vector friendly instruction format in one embodiment of the invention).

The second-fourth bytes (EVEX Bytes 1-3) include a number of bit fields providing specific capability.

REX field 205 (EVEX Byte 1, bits [7-5])—consists of a EVEX.R bit field (EVEX Byte 1, bit [7]—R), EVEX.X bit field (EVEX byte 1, bit [6]—X), and 157BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 110—this is the first part of the REX' field 110 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 215 (EVEX byte 1, bits [3:0]—mmmm)—its content encodes an implied leading opcode byte (0F, 0F 38, or 0F 3).

Data element width field 164 (EVEX byte 2, bit [7]—W)—is represented by the notation EVEX.W. EVEX.W is used to define the granularity (size) of the datatype (either 32-bit data elements or 64-bit data elements).

EVEX.vvvv 220 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 220 encodes the 4 low-order bits of the first source register specifier stored in inverted (1s complement) form. Depending on the instruction, an extra different EVEX bit field is used to extend the specifier size to 32 registers.

EVEX.U 168 Class field (EVEX byte 2, bit [2]-U)—If EVEX.U=0, it indicates class A or EVEX.U0; if EVEX.U=1, it indicates class B or EVEX.U1.

Prefix encoding field 225 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 152 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 154 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 110—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 170 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 230 (Byte 4) is also known as the opcode byte. Part of the opcode is specified in this field.

MOD R/M Field 240 (Byte 5) includes MOD field 242, Reg field 244, and R/M field 246. As previously described, the MOD field's 242 content distinguishes between memory access and non-memory access operations. The role of Reg field 244 can be summarized to two situations: encoding either the destination register operand or a source register operand, or be treated as an opcode extension and not used to encode any instruction operand. The role of R/M field 246 may include the following: encoding the instruction operand that references a memory address, or encoding either the destination register operand or a source register operand.

Scale, Index, Base (SIB) Byte (Byte 6)—As previously described, the scale field's 150 content is used for memory address generation. SIB.xxx 254 and SIB.bbb 256—the contents of these fields have been previously referred to with regard to the register indexes Xxxx and Bbbb.

Displacement field 162A (Bytes 7-10)—when MOD field 242 contains 10, bytes 7-10 are the displacement field 162A, and it works the same as the legacy 32-bit displacement (disp32) and works at byte granularity.

Displacement factor field 162B (Byte 7)—when MOD field 242 contains 01, byte 7 is the displacement factor field 162B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 162B is a reinterpretation of disp8; when using displacement factor field 162B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 162B substitutes the legacy x86 instruction set 8-bit displacement. Thus, the displacement factor field 162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 172 operates as previously described.

Full Opcode Field

FIG. 2B is a block diagram illustrating the fields of the specific vector friendly instruction format 200 that make up the full opcode field 174 according to one embodiment of the invention. Specifically, the full opcode field 174 includes the format field 140, the base operation field 142, and the data element width (W) field 164. The base operation field 142 includes the prefix encoding field 225, the opcode map field 215, and the real opcode field 230.

Register Index Field

FIG. 2C is a block diagram illustrating the fields of the specific vector friendly instruction format 200 that make up the register index field 144 according to one embodiment of the invention. Specifically, the register index field 144 includes the REX field 205, the REX' field 210, the MODR/M.reg field 244, the MODR/M.r/m field 246, the VVVV field 220, xxx field 254, and the bbb field 256.

Augmentation Operation Field

Figure 2D:
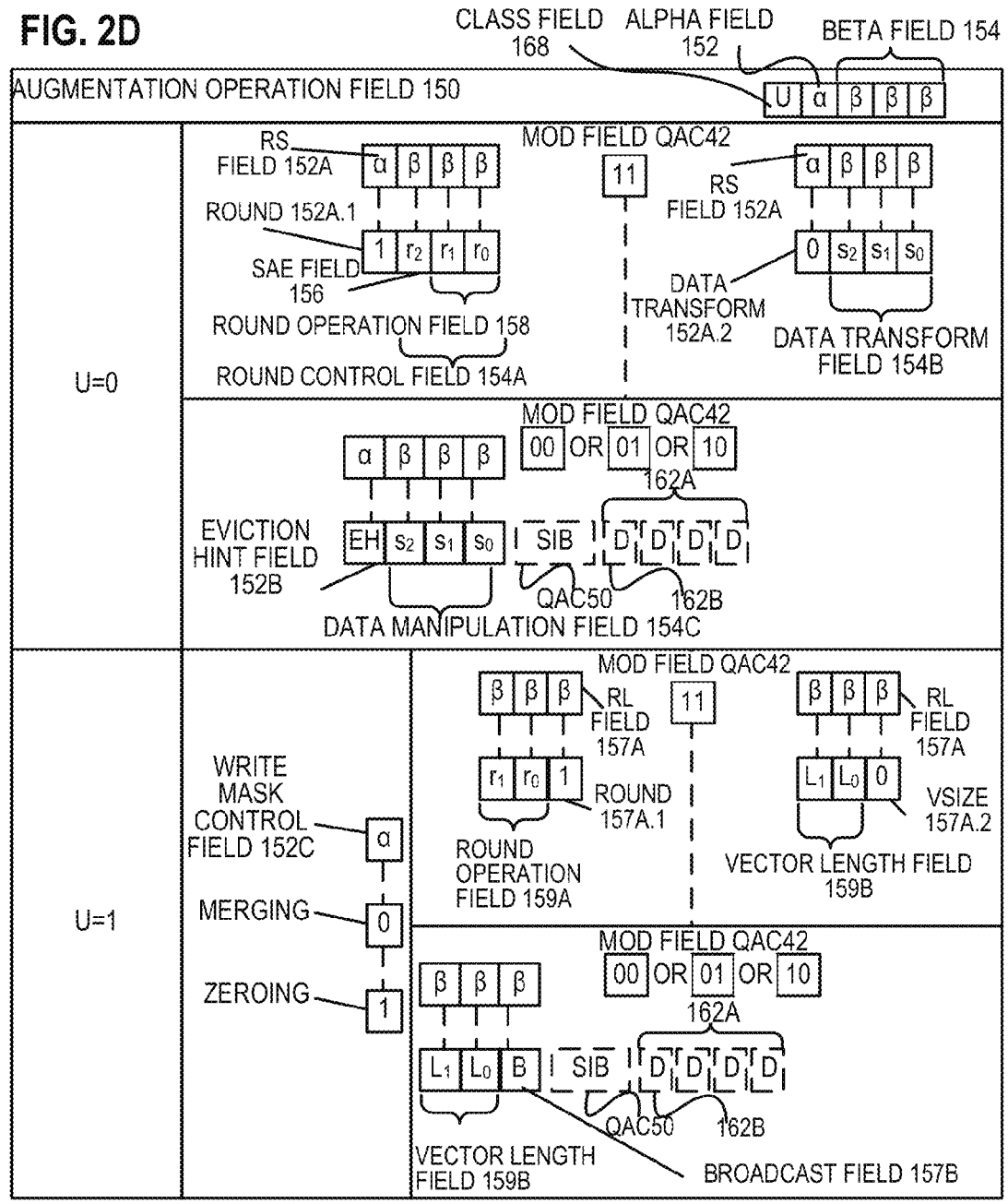

FIG. 2D is a block diagram illustrating the fields of the specific vector friendly instruction format 200 that make up the augmentation operation field 150 according to one embodiment of the invention. When the class (U) field 168 contains 0, it signifies EVEX.U0 (class A 168A); when it contains 1, it signifies EVEX.U1 (class B 168B). When U=0 and the MOD field 242 contains 11 (signifying a no memory access operation), the alpha field 152 (EVEX byte 3, bit [7]—EH) is interpreted as the rs field 152A. When the rs field 152A contains a 1 (round 152A.1), the beta field 154 (EVEX byte 3, bits [6:4]—SSS) is interpreted as the round control field 154A. The round control field 154A includes a one bit SAE field 156 and a two bit round operation field 158. When the rs field 152A contains a 0 (data transform 152A.2), the beta field 154 (EVEX byte 3, bits [6:4]—SSS) is interpreted as a three bit data transform field 154B. When U=0 and the MOD field 242 contains 00, 01, or 10 (signifying a memory access operation), the alpha field 152 (EVEX byte 3, bit [7]—EH) is interpreted as the eviction hint (EH) field 152B and the beta field 154 (EVEX byte 3, bits [6:4]—SSS) is interpreted as a three bit data manipulation field 154C.

When U=1, the alpha field 152 (EVEX byte 3, bit [7]—EH) is interpreted as the write mask control (Z) field 152C. When U=1 and the MOD field 242 contains 11 (signifying a no memory access operation), part of the beta field 154 (EVEX byte 3, bit [4]—$S_0$) is interpreted as the RL field 157A; when it contains a 1 (round 157A.1) the rest of the beta field 154 (EVEX byte 3, bit [6-5]—$S_{2-1}$) is interpreted as the round operation field 159A, while when the RL field 157A contains a 0 (VSIZE 157.A2) the rest of the beta field 154 (EVEX byte 3, bit [6-5]—$S_{2-1}$) is interpreted as the vector length field 159B (EVEX byte 3, bit [6-5]—$L_{1-0}$). When U=1 and the MOD field 242 contains 00, 01, or 10 (signifying a memory access operation), the beta field 154 (EVEX byte 3, bits [6:4]—SSS) is interpreted as the vector length field 159B (EVEX byte 3, bit [6-5]—$L_{1-0}$) and the broadcast field 157B (EVEX byte 3, bit [4]—B).

C. Exemplary Register Architecture

Figure 3:
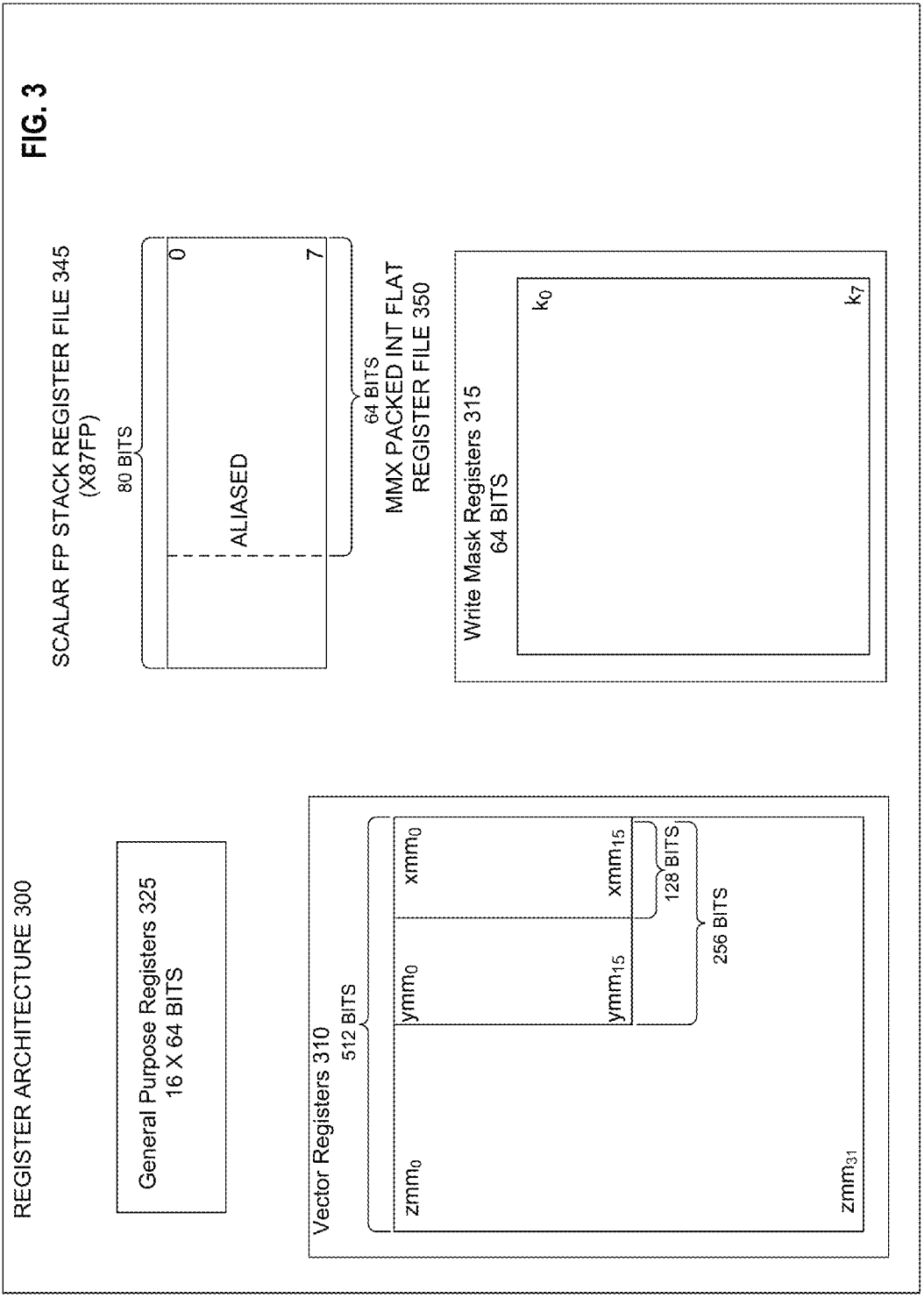
FIG. 3 is a block diagram of a register architecture according to one embodiment of the invention.

FIG. 3 is a block diagram of a register architecture 300 according to one embodiment of the invention. In the embodiment illustrated, there are 32 vector registers 310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 200 operates on these overlaid register file as illustrated in the below tables.

| Adjustable Vector Length | Class | Operations | Registers |
|---|---|---|---|
| Instruction Templates that do not include the vector length field 159B | A (FIG. 1A; U = 0) | 110, 115, 125, 130 | zmm registers (the vector length is 64 byte) |
| | B (FIG. 1B; U = 1) | 112 | zmm registers (the vector length is 64 byte) |
| Instruction templates that do include the vector length field 159B | B (FIG. 1B; U = 1) | 117, 127 | zmm, ymm, or xmm registers (the vector length is 64 byte, 32 byte, or 16 byte) depending on the vector length field 159B |

In other words, the vector length field 159B selects between a maximum length and one or more other shorter lengths, where each such shorter length is half the length of the preceding length; and instructions templates without the vector length field 159B operate on the maximum vector length. Further, in one embodiment, the class B instruction templates of the specific vector friendly instruction format 200 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 315—in the embodiment illustrated, there are 8 write mask registers (k0 through k7), each 64 bits in size. In an alternate embodiment, the write mask registers 315 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

D. Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a write mask registers unit, and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 16-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input. Write mask registers 526 allow predicating resulting vector writes.

Figure 6:
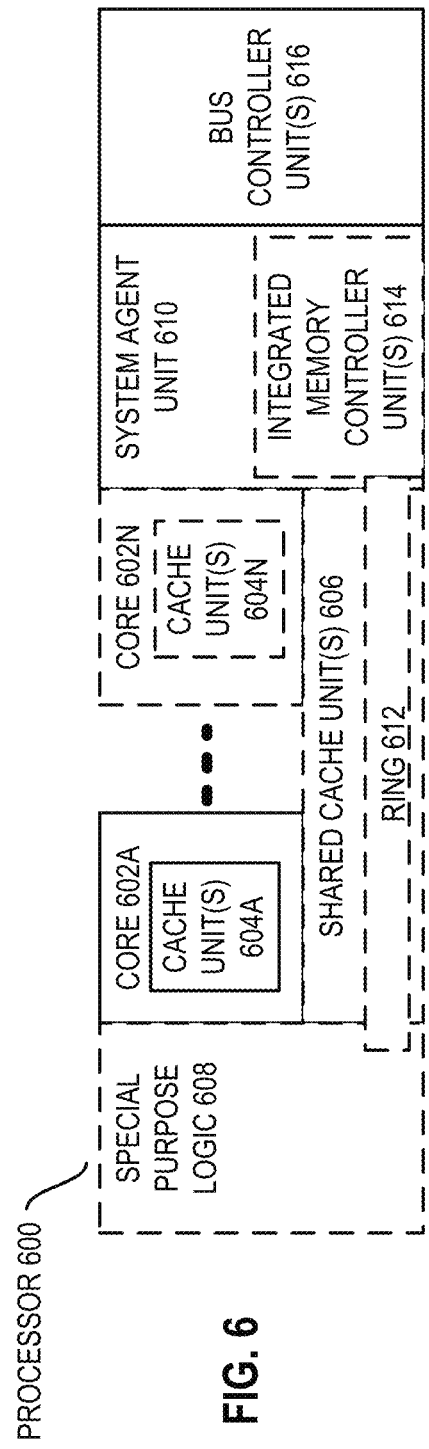
FIG. 6 is a block diagram of a single core processor and a multicore processor with integrated memory controller and graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
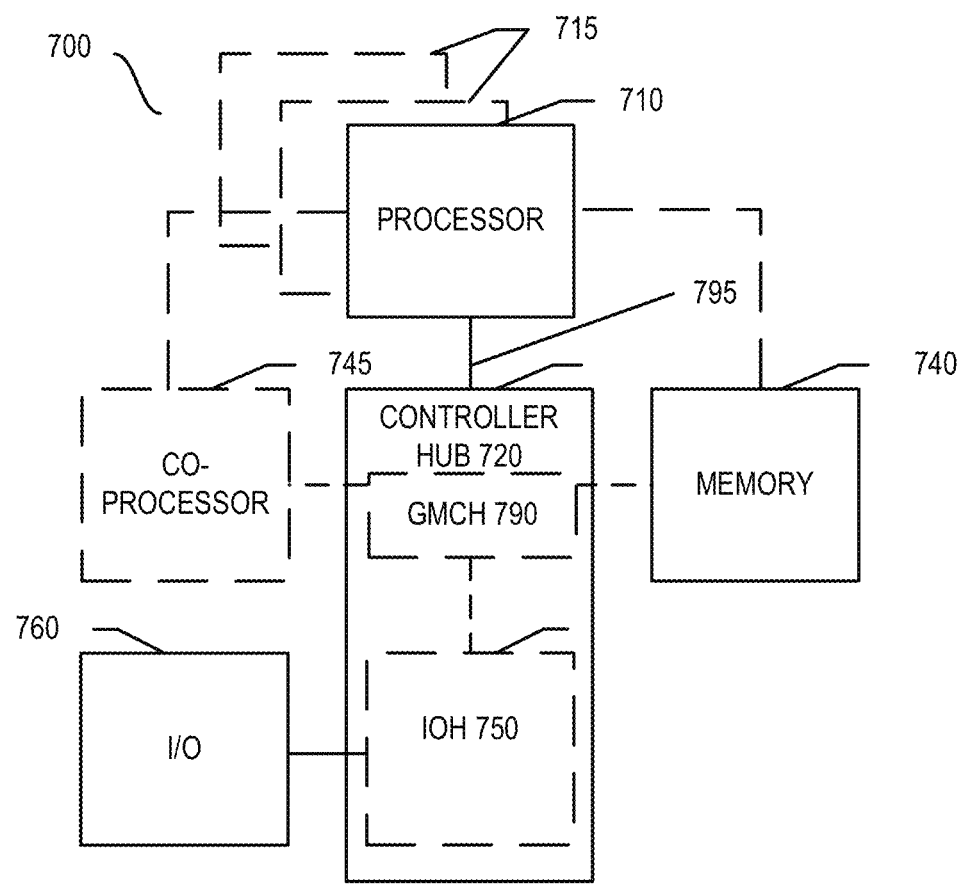
FIG. 7 illustrates a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface such as QuickPath Interconnect (QPI), or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 715 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
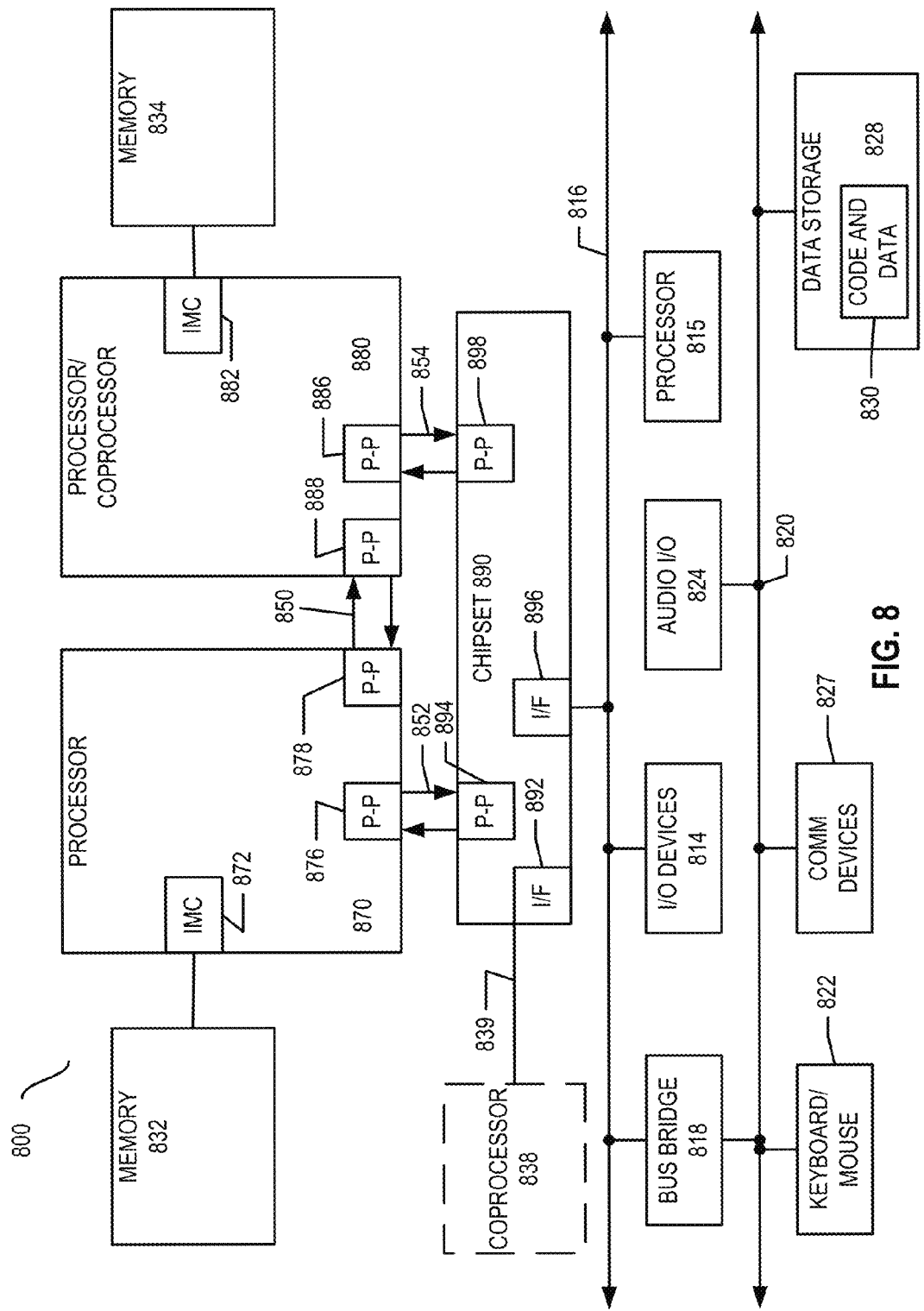
FIG. 8 illustrates a block diagram of a second system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 839. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 820. Note that other architectures are possible. For example, instead of the point-to-point architecture of FIG. 8, a system may implement a multi-drop bus or other such architecture.

Figure 9:
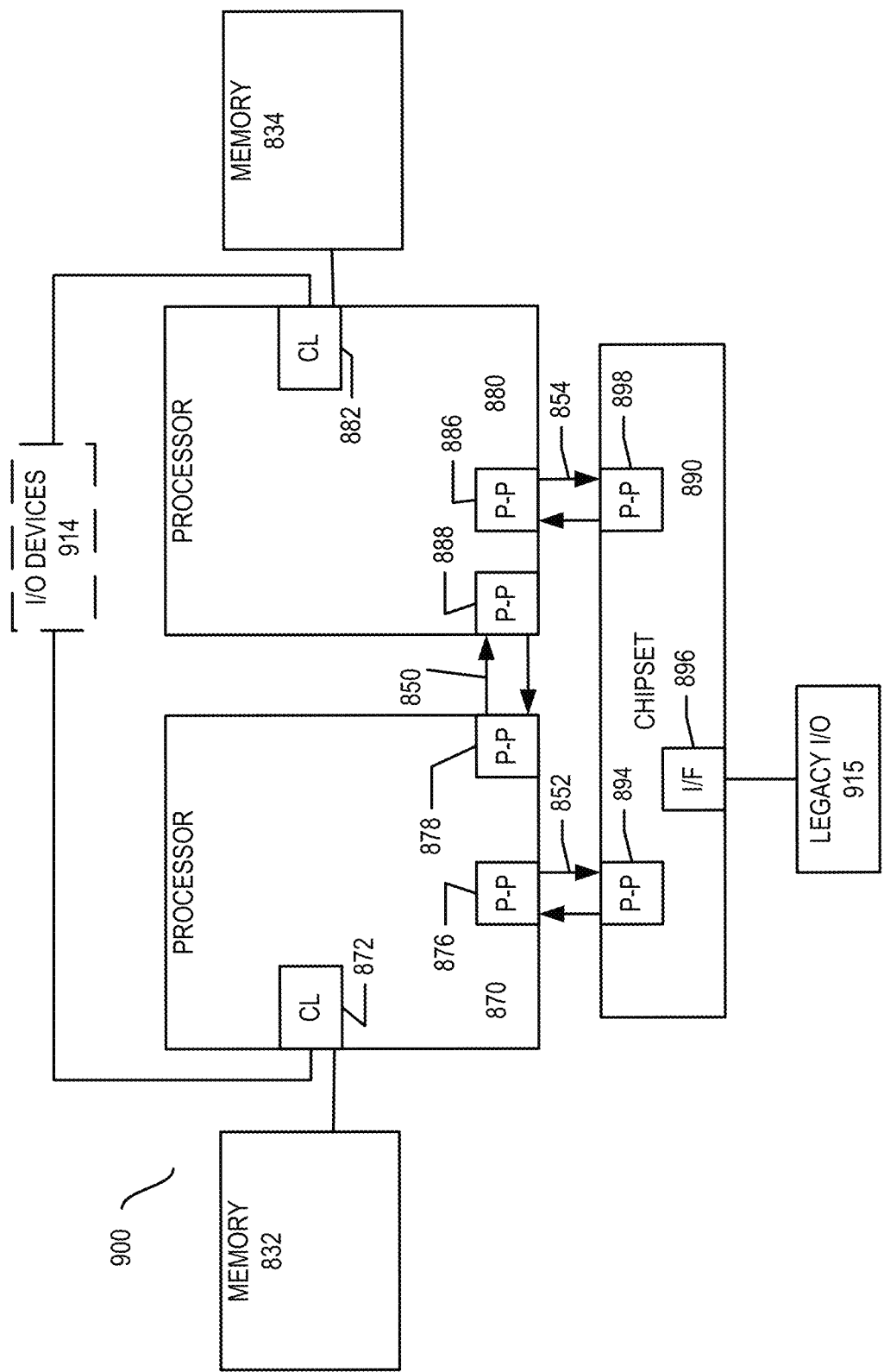
FIG. 9 illustrates a block diagram of a third system in accordance with an embodiment of the present invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 872 and 882, respectively. Thus, the CL 872, 882 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
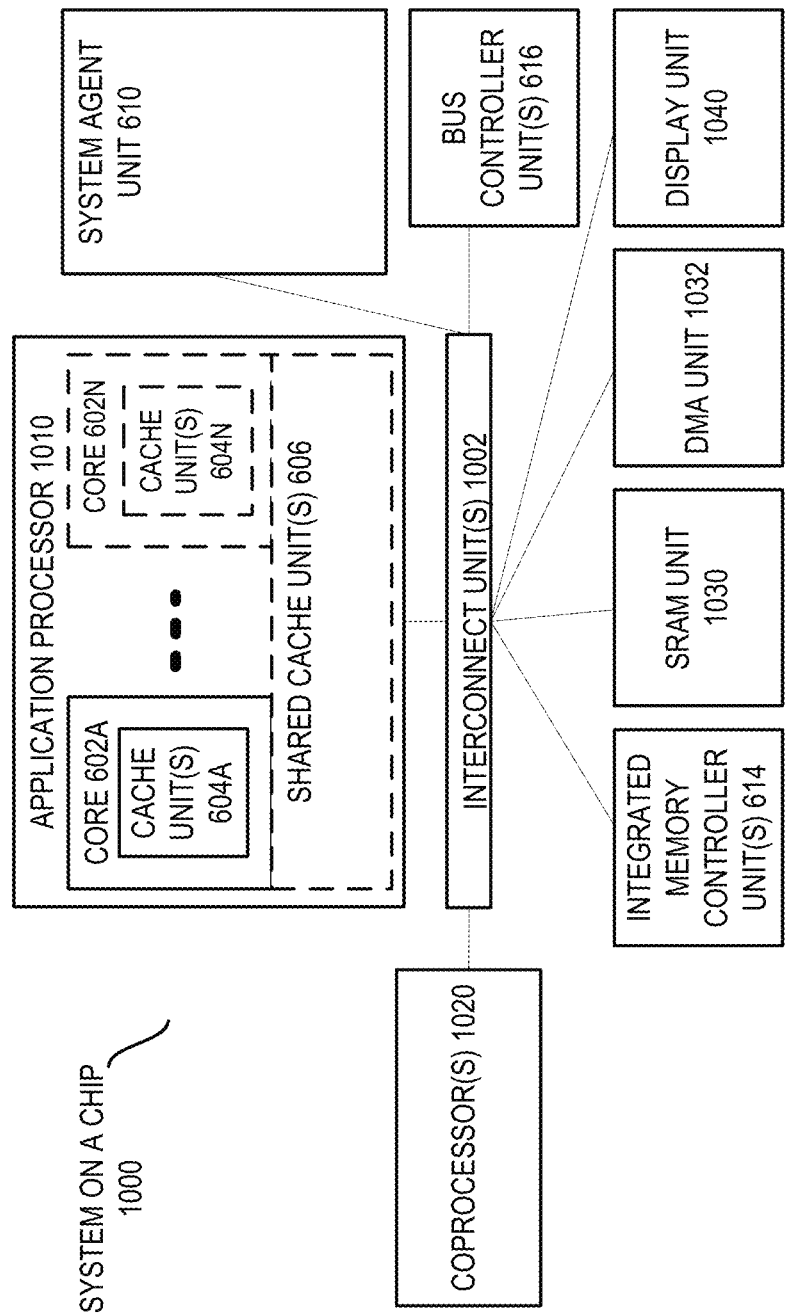
FIG. 10 illustrates a block diagram of a system on a chip (SoC) in accordance with an embodiment of the present invention.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 202A-N and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
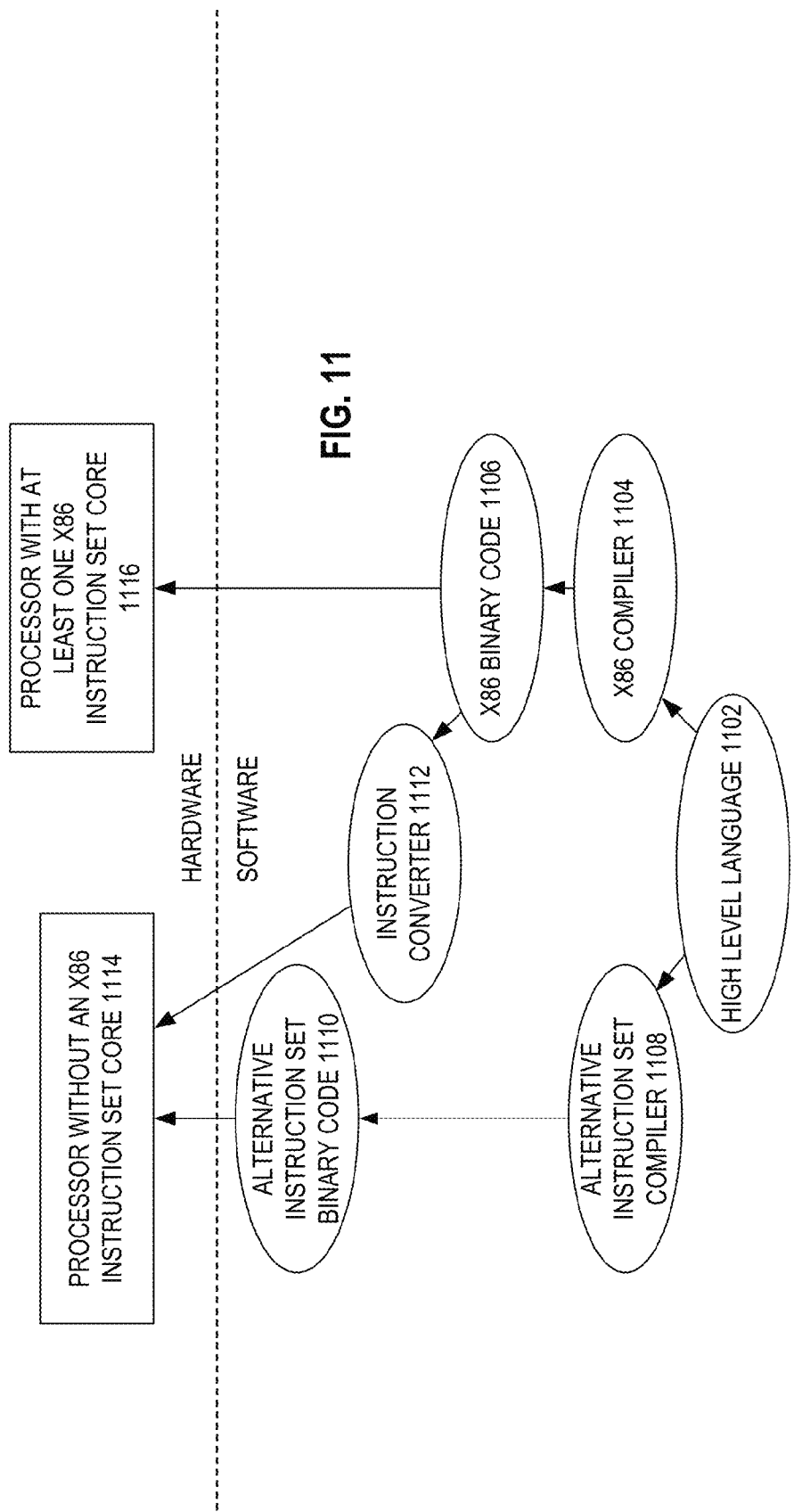
FIG. 11 illustrates a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an x86 compiler 1104 to generate x86 binary code 1106 that may be natively executed by a processor with at least one x86 instruction set core 1116. The processor with at least one x86 instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1104 represents a compiler that is operable to generate x86 binary code 1106 (e.g., object code) that can, with or without additional linkage processing, be executed on the processor with at least one x86 instruction set core 1116. Similarly, FIG. 11 shows the program in the high level language 1102 may be compiled using an alternative instruction set compiler 1108 to generate alternative instruction set binary code 1110 that may be natively executed by a processor without at least one x86 instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the x86 binary code 1106 into code that may be natively executed by the processor without an x86 instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have an x86 instruction set processor or core to execute the x86 binary code 1106.

Method and Apparatus for Implementing a Check to Optimize Instruction Flow

Correctly rounded functions such as division and square root can be implemented in two ways (per IEEE): using a radix-based hardware divider to provide the functionality natively, or implementing a software instruction/microcode (ucode) sequence, typically a form/variation of the Newton-Raphson algorithm, to iterate over a seed to get the final result.

One problem with software sequences is that while the algorithm can be processed very efficiently for most inputs, additional processing is required for some certain corner cases which results in a sequence which is an order of magnitude slower (e.g., when dealing with input denormals). In addition, a final post-processing is required to patch the result when the inputs have a trivial outcome (such as division by zero), which adds to the critical latency of the sequence.

In one embodiment, an instruction sequence assumes the best case, and it jumps to an alternate or "slow" sequence when there is a corner case in the inputs, checking out of the critical path of the default sequence. The embodiments of the invention include a type of "check" instruction or microoperation (uop) that pre-calculates this conditional jump in a separate path than the main default computation. In some embodiments, the instruction check operation also provides the default answers for trivial inputs. While the embodiments described below focus on division and square root (sqrt) implementations, the underlying principles of the invention are not limited to any particular type of mathematical function. More specifically, one embodiment is based on an AVX-512 implementation of packed square root/division (e.g., using a predication/mask) but the concept can be extended to any instruction set architecture.

One embodiment of the "check" instruction/uop decides, based on the inputs, whether to process the algorithm with a default/fast flow or to alternatively jump to the slow flow, leaving the boolean vector into a mask. In addition, one embodiment generates pre-computational exception flags (invalid, denormal and divide by zero) and aborts execution if they are unmasked. Finally, one embodiment of the invention pre-calculates a default answer for trivial inputs (e.g., such as divide by infinity).

Figure 12:
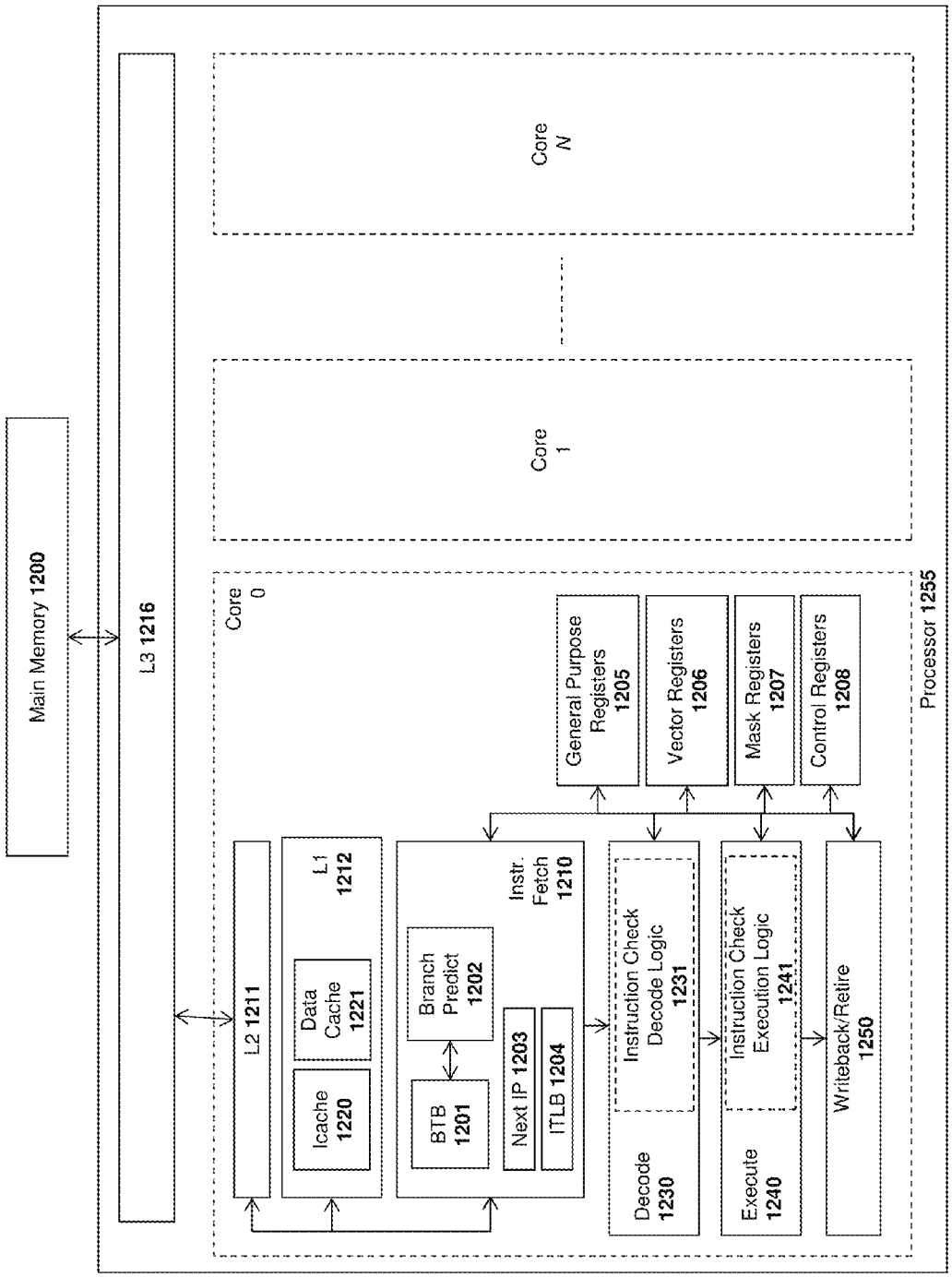
FIG. 12 illustrates an exemplary processor on which embodiments of the invention may be implemented.

As illustrated in FIG. 12, an exemplary processor 1255 on which embodiments of the invention may be implemented includes instruction check decode logic 1231 within a decode stage 1230 of the processor pipeline for decoding instruction check instructions and instruction check execution logic 1241 within an execution stage 1240 of the pipeline for executing the instruction check instructions. In one embodiment, the instruction check decode logic 1231 comprises hardware for decoding the instruction check instructions into a plurality of micro-operations which are then executed by the instruction check execution logic 1241. However, the underlying principles of the invention are not limited to a micro-coded processor. As mentioned, in one embodiment, the instructions include a division check instruction (DIVCHK( )) and a square root check (SQRTCHK( )). However, the underlying principles of the invention are not limited to these specific implementations.

Other processor components shown in FIG. 12 include a set of general purpose registers (GPRs) 1205, a set of vector registers 1206, a set of mask registers 1207, and a set of control registers 1208. Although not explicitly shown in FIG. 12, the control registers 1208 may be accessed via a separate control register bus (CRBus) interface. In one embodiment, the mask registers 1207 include eight 64-bit operand mask registers used for performing bit masking operations on the values stored in the vector registers 1206 (e.g., implemented as mask registers k0-k7 described above). However, the underlying principles of the invention are not limited to any particular mask register size/type. In one embodiment, multiple vector data elements may be packed into each vector register 1206 which may have a 512 bit width for storing two 256 bit values, four 128 bit values, eight 64 bit values, sixteen 32 bit values, etc. However, the underlying principles of the invention are not limited to any particular size/type of vector data.

The details of a single processor core ("Core 0") are illustrated in FIG. 12 for simplicity. It will be understood, however, that each core shown in FIG. 12 may have the same set of logic as Core 0. For example, each core may include a dedicated Level 1 (L1) cache 1212 and Level 2 (L2) cache 1211 for caching instructions and data according to a specified cache management policy. The L1 cache 1212 includes a separate instruction cache 1220 for storing instructions and a separate data cache 1221 for storing data. The instructions and data stored within the various processor caches are managed at the granularity of cache lines which may be a fixed size (e.g., 64, 128, 512 Bytes in length). Each core of this exemplary embodiment has an instruction fetch unit 1210 for fetching instructions from main memory 1200 and/or a shared Level 3 (L3) cache 1216; a decode unit 1220 for decoding the instructions (e.g., decoding program instructions into micro-operatons or "uops"); an execution unit 1240 for executing the instructions; and a writeback unit 1250 for retiring the instructions and writing back the results.

The instruction fetch unit 1210 includes various well known components including a next instruction pointer 1203 for storing the address of the next instruction to be fetched from memory 1200 (or one of the caches); an instruction translation look-aside buffer (ITLB) 1204 for storing a map of recently used virtual-to-physical instruction addresses to improve the speed of address translation; a branch prediction unit 1202 for speculatively predicting instruction branch addresses; and branch target buffers (BTBs) 1201 for storing branch addresses and target addresses. Once fetched, instructions are then streamed to the remaining stages of the instruction pipeline including the decode unit 1230, the execution unit 1240, and the writeback unit 1250. The structure and function of each of these units is well understood by those of ordinary skill in the art and will not be described here in detail to avoid obscuring the pertinent aspects of the different embodiments of the invention.

Figure 13:
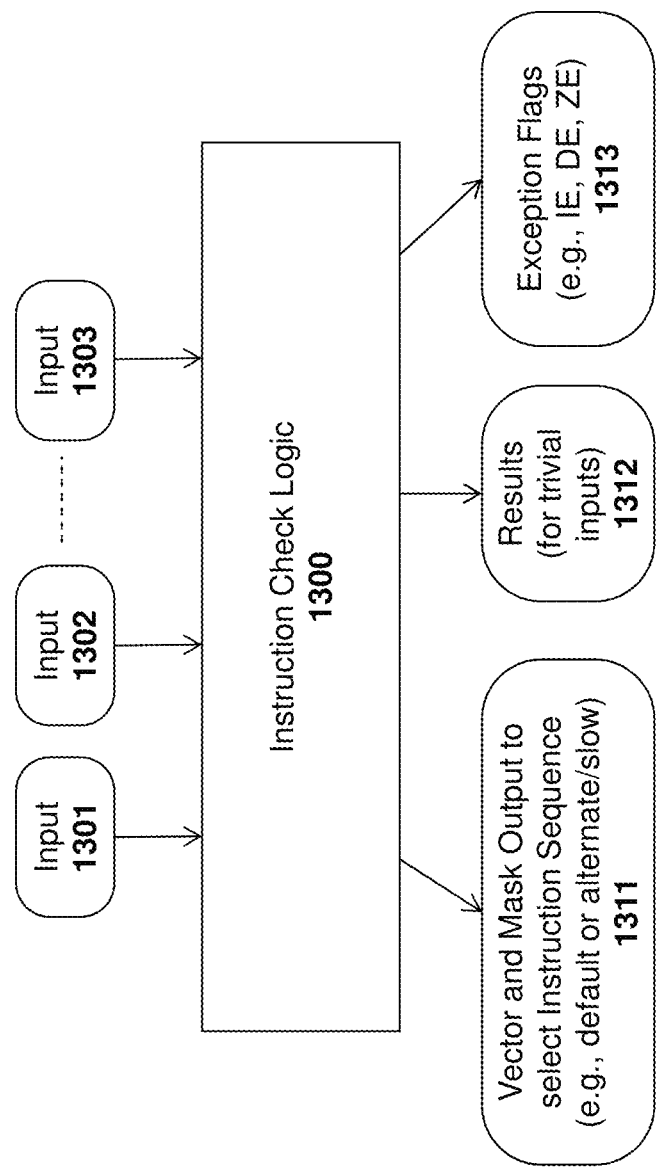
FIG. 13 illustrates instruction check logic for checking inputs of an instruction and responsively generating a set of outputs usable to determine a next instruction sequence.

FIG. 13 illustrates instruction check logic 1300 which generates a vector output and a mask output to select a particular instruction sequence 1311 (e.g., a default/fast sequence or an alternate/slow sequence) based on a plurality of input values 1301-1303 associated with a current instruction (e.g., inputs for a division or square root instruction). Various specific examples of the vector and mask outputs are provided below for division and square root instructions (see, e.g., FIG. 14 (division) and FIG. 15 (square root)). In addition, in some embodiments, the instruction check logic 1300 may generate results 1312 for certain types of inputs (e.g., trivial inputs such as divide by infinity) and may generate exception flags 1313 usable by the subsequent instruction sequences 1311. By way of example, the exception flags may include floating point exception flags such as divide by zero (ZE), invalid operation (IE), and denormalized operand (DE).

As discussed above, the instruction check logic 1300 may include logic within the decode stage 1230 (e.g., instruction check decode logic 1231) which decodes the instructions into a plurality of uops and execution stage 1240 (e.g., instruction check execution logic 1241) which executes the uops to implement the techniques described herein. It should be noted, however, that the underlying principles of the invention are not limited to a microcoded processor architecture.

One embodiment of a division check (DIVCHK) instruction will now be described which performs a check on inputs and other variables associated with a division instruction and responsively selects an appropriate/efficient instruction sequence to implement the division operation. In one embodiment, the ucode flow strategy for division is as follows:

```
division(x,y)
{
    start_fast_sequence(x,y);
    if(DIVCHK( ))
        jump slow_flow;
    else
        finish_fast_flow(x,y)
        return res;
slow_flow:
    do_slow_flow(x,y)
    return res;
}
```

In the above code, DIVCHK evaluates inputs (x, y) to determine whether to jump to the alternate "slow_flow"

instruction sequence or to complete the normal, "finish_fast_flow" sequence. In one embodiment, the following DIVCHK specification is employed.

In one embodiment, the uop ALU_UOP_{DIVCHK} {PS,PD} is employed where the first parameter (Param 1) checks division inputs and the second parameter (Param2) indicates whether the operation involves single-precision or double-precision inputs. The ALU_UOP may use a first source (srcA) as a numerator and a second source (scrB) as a denominator, checks the characteristics of the inputs for a division sequence and returns three different pieces of information:

1. A vector output with the special case input default response (e.g., division by zero returns INF). In one embodiment, it outputs a special indication (e.g., +1.0) if the actual output needs to be generated using the slow path algorithm.

2. A mask output signaling those elements that can be processed using the fast path algorithm. In one embodiment, a mask of zero means that either the result is trivial or that the computation needs to happen via a slow flow sequence (as specified by the special indication such as +1.0).

3. Per-computational exception flag generation. This may include, for example, floating point exception flags such as divide by zero (ZE), invalid operation (IE), and denormalized operand (DE).

The table shown in FIG. 14 summarizes the three outputs in function of the two different input types (X is INPUT1 while Y is INPUT2). In this table, the X input is shown in rows and the Y input is shown in columns. The resulting output is arranged as (kdst, vdst, flags) where "kdst" comprises the mask output, "vdst" comprises the vector output, and "flags" comprises the exception flags. The input "denorm" stands for a denormalized operand, "normal" stands for a normal operand, and "Inf" stands for infinite. "NaN stands for "not a number," QNaN stands for quiet NaN and SNaN stands for signaling NaN. A QNaN is a NaN with the most significant fraction bit set; an SNaN is a NaN with the most significant fraction bit clear.

In one embodiment, the case where both inputs are normal numbers (indicated by "see below" in the table) is handled as follows:

```
xExp = biased exponent of x;   // memory form of the exponent
yExp = biased exponent of y;   // memory form of the exponent
eDiff = xExp – yExp;
    if (      (eDiff ≥ bias + 1 ) || // quotient may overflow
              (eDiff ≤ (1 – bias) ) || // quotient may underflow
              (yExp ≥ (2*bias – 1) ) || // reciprocal may underflow
              (xExp ≤ 2*precision ) // residual may underflow (*)
    ) {
       return (0,+1.0,None);
    } else
       return (1,+0.0,None);
    }
```

Thus, the above code tests for a quotient overflow/underflow, a reciprocal underflow, and a residual underflow. If any of these conditions is detected, the vector output is +1.0; if not, the vector output is +0.0. For the residual test, 2*precision may be required instead of 1*precision because the user may have DAZ (denormals-are-zero flag in the MXCSR register) or FZ (flush to zero flag in the MXCSR) set to 1, and hence denormals are flushed in internal calculations.

In one embodiment, the DIVCHK operation takes the following form:
```
// alu_uop_DIVCHK_PS (.INPUT1(src_a), .INPUT2(src_b))
for(n=0; n<2; n+=1)
{
    i = n*32
    {MASK_OUTPUT[n], VECT_OUTPUT[i+31:i]}
        = divchk(INPUT1[i+31:i], INPUT2[i+31:i]) // (x, y)
}
```

Exceptions may be generated for Denormal (if DAZ=0), Invalid and Division-by-zero for both single-precision and double-precision floating point data elements.

One embodiment of a square root check (SQRTCHK) instruction will now be described which performs a check on inputs and other variables associated with a square root instruction and responsively selects an appropriate/efficient instruction sequence to implement the square root operation. In one embodiment, the ucode flow strategy for square root is as follows:

```
sqrt(x)
{
       start_fast_sequence(x);
    if(SQRTCHK( ))
           jump slow_flow;
    else
           finish_fast_flow(x)
           return res;
    Slow_flow:
           do_slow_flow(x)
           return res;
}
```

In the above code, the SQRTCHK evaluates the input x to determine whether to jump to the alternate "slow_flow" instruction sequence or to complete the normal, "finish_fast_flow" sequence. In one embodiment, the following SQRTCHK specifications are employed.

ALU_UOP_{SQRTCHK} {PS,PD} is a microoperation employed in one embodiment where the first parameter {SQRTCHK} checks the square root instruction inputs and the second parameter {PS,PD} indicates whether the operation involves single-precision or double-precision inputs. The ALU_UOP checks the characteristics of the inputs for a square root sequence and returns three different pieces of information:

1. A vector output with the special case input default response (e.g., the square root of a negative number returns a NaN). In one embodiment, it outputs a special indication (e.g., +1.0) if the actual output needs to be generated using the fast path algorithm.

2. A mask output signaling those elements that must be processed using the slow path algorithm.

3. Per-computational exception flag generation. This may include, for example, floating point exception flags such as invalid operation (IE) and denormalized operand (DE).

The table shown in FIG. 15 lists various different input types for x (first column) and the resulting output arranged as (kdst, vdst, flags) where "kdst" comprises the mask output, "vdst" comprises the vector output, and "flags" comprises the exception flags. The inputs include −norm (including −infinity +/−denormailized operands, +/−0, + ininity, qNaN, and sNaN. The restriction BiasExponent (x)≤2*precision (identified as condition (a) in the table) is intended to guard against underflow in the computation of d=x−s*s. For example, in double precision, the square root of x=2-1021 is needed. Then using the rsqrt28 instruction, the initial approximation to the reciprocal sqrt would be r=2-511(1/√2)(1−ϵ) where |ϵ|<½-28. Then s=x*r≈√2(1−ϵ)/2511 and therefore d=x−s*s≈(ϵ−ϵ2/2)/21020<21028 which is in the denormal range. Note that in theory, it should only be 1*precision, but since we may execute under DAZ (denormals-are-zero flag)=1 or FZ (flush-to-zero flag)=1, we must guard against the possibility of flushing denormals during internal computations.

Similarly, the algorithm computes 'residual' values, which we usually call d so as not to confuse it with the reciprocal sqrt (r). The residual is computed as d←x−s*s where s was defined previously. If rounding issues are ignored, then s~sqrt(x) and s*s~x, so if x is near the overflow threshold, then s*s might overflow. This is what the (b) condition highlighted in the table is intended to guard against. Note that condition (b) is not required for a fused multiply and add.

```
// alu_uop_SQRTCHK_PS (.INPUT1(src_b))
for(n=0; n<2; n+=1)
{
    i = n*32
    {MASK_OUTPUT[n], VECT_OUTPUT[i+31:i]}
    = sqrtchk(INPUT1[i+31:i]);
}
```

Exceptions may be generated for Denormal (if DAZ=0) and Invalid for both single-precision and double-precision floating point data elements.

Figure 16:
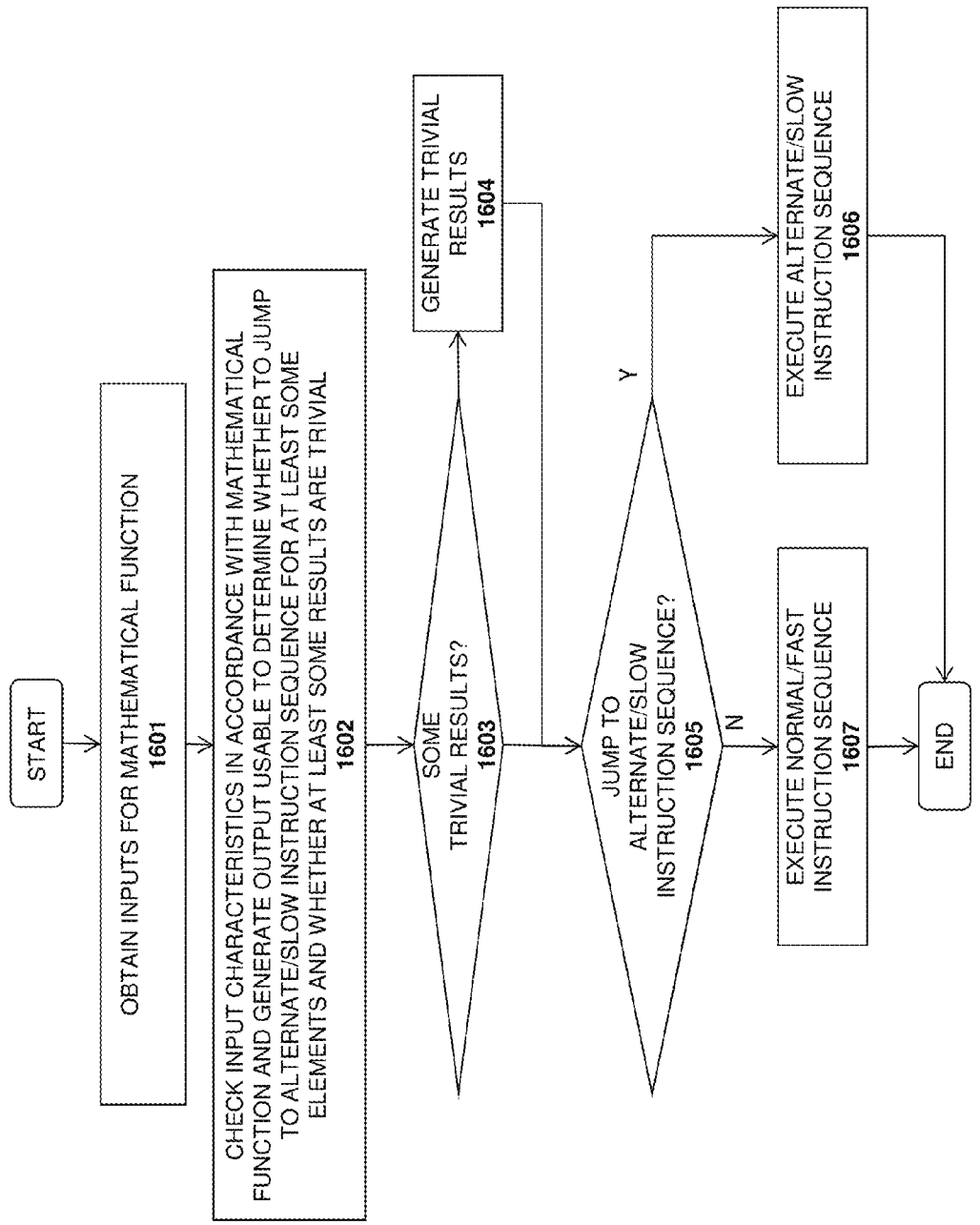
FIG. 16 illustrates one embodiment of a method for performing a check operation and selecting a first instruction sequence or a second instruction sequence.

A method in accordance with one embodiment of the invention is illustrated in FIG. 16. The method may be implemented within the context of the architectures described above, but is not limited to any particular architecture.

At 1601, inputs are obtained from a mathematical function. For example, if the mathematical function is a division, then the inputs comprise the numerator (x) and denominator (y). If the mathematical function is a square root, then the input comprises the number for which a square root is needed (x). At 1602, various characteristics of the inputs are evaluated in accordance with the mathematical function to generate an output which indicates whether a jump should be made to an alternate/slow instruction sequence. For example, as discussed above, the output may include a vector output with the special case input default response (e.g., division by zero returns INF), a mask output signaling those elements that can be processed using the fast path algorithm, and per-computational exception flags. Based on the results in 1602, a determination is made at 1603 as to whether a jump to an alternate/slow instruction sequence is warranted. If so, then at 1605, the alternate/slow instruction sequence is executed. As mentioned above, the alternate/slow instruction sequence may provide default answers for trivial inputs. If the determination at 1603 is that the alternate/slow instruction sequence is not warranted, then at 1604 the normal/fast instruction sequence is executed (e.g., using normal operand values to calculate the result of the division, square root, or other mathematical function).

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
    an arithmetic logic unit (ALU) to execute a plurality of mathematical instructions using one or more source operands;
    instruction check logic to evaluate the source operands for a current mathematical instruction and to determine, based on the evaluation, whether to execute a default sequence of operations including executing the current mathematical instruction by the ALU or to jump to an alternate sequence of operations adapted to provide a result for the mathematical instruction having particular types of source operands comprising denormalized operands, being equal to infinity, being not-a-number (NaN), and/or resulting in a divide-by-zero, the alternate sequence of operations to be executed more efficiently by using less time than the default sequence of operations.

2. The processor as in claim 1 wherein the current mathematical instruction comprises a division instruction having a numerator and denominator specified by the source operands and wherein the instruction check logic is to cause a jump to the alternate sequence of operations responsive to either of the numerator or denominator being denormalized operands, being equal to infinity, being not-a-number (NaN) operands, and/or resulting in a divide-by-zero.

3. The processor as in claim 2 wherein the instruction check logic is to set one or more exception flags in the processor including divide by zero (ZE), an invalid operation (1E), and/or denormalized operand (DE).

4. The processor as in claim 1 wherein the current instruction comprises a square root instruction having a source operand value on which to perform a square root operation, wherein the instruction check logic is to cause a jump to the alternate sequence of operations responsive to the source operand being a negative number, being a denormalized operand, being equal to infinity, and/or being a not-a-number (NaN) operand.

5. The processor as in claim 1 wherein the current instruction comprises a square root instruction having a source operand value (x) on which to perform a square root operation, wherein the instruction check logic is to cause a jump to the alternate sequence of operations responsive to a comparison performed using x.

6. The processor as in claim 1 wherein upon performing the evaluation of the source operands, the instruction check logic is to generate a vector output indicating whether to execute the default sequence of the alternate sequence.

7. The processor as in claim 6 wherein the instruction check logic is further to generate a mask output signaling elements to be processed with the alternate sequence.

8. The processor as in claim 7 wherein the instruction check logic is further to generate a per-computational exception flag output to indicate one or more exceptions resulting from performing the mathematical operation on the source operands.

9. The processor as in claim 1 wherein the default sequence of operations comprises a default sequence of instructions or microoperations and wherein the alternate sequence of operations comprises an alternate sequence of instructions or microoperations.

10. A method comprising:
obtaining one or more source operands for a current mathematical instruction;
evaluating the source operands for the current mathematical instruction;
determining, based on the evaluation, whether to execute a default sequence of operations including executing the current mathematical instruction or to jump to an alternate sequence of operations adapted to provide a result for the mathematical instruction having particular types of source operands comprising denormlized operands, being equal to infinity, being not-a-number (NaN) and/or resulting in a divide-by-zero, the alternate sequence of operations to be executed more efficiently by using less time than the default sequence of operations.

11. The method as in claim 10 wherein the current mathematical instruction comprises a division instruction having a numerator and denominator specified by the source operands and wherein, the method comprising jumping to the alternate sequence of operations responsive to either of the numerator or denominator being denormalized operands, being equal to infinity, being not-a-number (NaN) operands, and/or resulting in a divide-by-zero.

12. The method as in claim 11 further comprising setting one or more exception flags in the method including divide by zero (ZE), an invalid operation (1E), and/or denormalized operand (DE).

13. The method as in claim 10 wherein the current instruction comprises a square root instruction having a source operand value on which to perform a square root operation, the method further comprising jumping to the alternate sequence of operations responsive to the source operand being a negative number, being a denormalized operand, being equal to infinity, and/or being a not-a-number (NaN) operand.

14. The method as in claim 10 wherein the current instruction comprises a square root instruction having a source operand value (x) on which to perform a square root operation, the method further comprising jumping to the alternate sequence of operations responsive to a comparison performed using x.

15. The method as in claim 10 further comprising generating a vector output indicating whether to execute the default sequence of the alternate sequence upon performing the evaluation of the source operands.

16. The method as in claim 15 further comprising generating a mask output signaling elements to be processed with the alternate sequence.

17. The method as in claim 16 further comprising generating a per-computational exception flag output to indicate one or more exceptions resulting from performing the mathematical operation on the source operands.

18. The method as in claim 10 wherein the default sequence of operations comprises a default sequence of instructions or microoperations and wherein the alternate sequence of operations comprises an alternate sequence of instructions or microoperations.

19. A system comprising:
a memory to store instructions and data, including mathematical instructions and graphics instructions;
a plurality of cores to execute the mathematical instructions and process the data;
a graphics processor unit to perform graphics operations in response to the graphics instructions;
a network interface for receiving and transmitting data over a network;
an interface for receiving user input from a mouse or cursor control device; and
an arithmetic logic unit (ALU) to execute a plurality of mathematical instructions using one or more source operands;
instruction check logic to evaluate the source operands for a current mathematical instruction and to determine, based on the evaluation, whether to execute a default sequence of operations including executing the current mathematical instruction by the ALU or to jump to an alternate sequence of operations adapted to provide a result for the mathematical instruction having particular types of source operands comprising denormlized operands, being equal to infinity, being not-a-number (NaN) and/or resulting in a divide-by-zero, the alternate sequence of operations to be executed more efficiently than the default sequence of operations.

20. The system as in claim 19 wherein the current mathematical instruction comprises a division instruction having a numerator and denominator specified by the source operands and wherein the instruction check logic is to cause a jump to the alternate sequence of operations responsive to either of the numerator or denominator being denormalized operands, being equal to infinity, being not-a-number (NaN) operands, and/or resulting in a divide-by-zero.

21. The system as in claim 20 wherein the instruction check logic is to set one or more exception flags in the processor including divide by zero (ZE), an invalid operation (1E), and/or denormalized operand (DE).

22. The system as in claim 19 wherein the current instruction comprises a square root instruction having a source operand value on which to perform a square root operation, wherein the instruction check logic is to cause a jump to the alternate sequence of operations responsive to the source operand being a negative number, being a denormalized operand, being equal to infinity, and/or being a not-a-number (NaN) operand.

23. The system as in claim 19 wherein the current instruction comprises a square root instruction having a source operand value (x) on which to perform a square root operation, wherein the instruction check logic is to cause a jump to the alternate sequence of operations responsive to a comparison performed using x.

24. The system as in claim 19 wherein upon performing the evaluation of the source operands, the instruction check logic is to generate a vector output indicating whether to execute the default sequence of the alternate sequence.

25. The system as in claim 24 wherein the instruction check logic is further to generate a mask output signaling elements to be processed with the alternate sequence.

\* \* \* \* \*